(12) United States Patent
Dave

(10) Patent No.: US 7,201,988 B2
(45) Date of Patent: Apr. 10, 2007

(54) UNITIZED FUEL CELL ELECTRODE GASKET ASSEMBLY

(75) Inventor: Nileshkumar Trambaklal Dave, West Hartford, CT (US)

(73) Assignee: UTC Power Corporation, South Windsor, CT (US)

( * ) Notice: Subject to any disclaimer, the term of this patent is extended or adjusted under 35 U.S.C. 154(b) by 134 days.

(21) Appl. No.: 10/930,364

(22) Filed: Aug. 30, 2004

(65) Prior Publication Data
US 2005/0031935 A1    Feb. 10, 2005

Related U.S. Application Data

(63) Continuation of application No. 10/036,213, filed on Dec. 28, 2001, now abandoned.

(51) Int. Cl.
   *H01M 2/08* (2006.01)
(52) U.S. Cl. .................................. 429/36; 429/35
(58) Field of Classification Search .................. None
   See application file for complete search history.

(56) References Cited

U.S. PATENT DOCUMENTS

| | | | |
|---|---|---|---|
| 6,022,634 A | 2/2000 | Ramunni et al. | |
| 6,159,628 A * | 12/2000 | Grasso et al. | 429/35 |
| 6,387,557 B1 | 5/2002 | Krasij et al. | |
| 6,440,597 B1 * | 8/2002 | Mizuno | 429/34 |

* cited by examiner

Primary Examiner—Patrick Joseph Ryan
Assistant Examiner—Julian Mercado
(74) Attorney, Agent, or Firm—M. P. Williams

(57) ABSTRACT

A silicone rubber gasket (35) is adhered to an anode substrate (14) by sealant material, such as a thermoplastic polymer, a thermoset polymer or en elastomeric polymer, which is impregnated (31) to provide an edge seal to the anode substrate. In one embodiment, a silicone rubber gasket (36) is adhered to the cathode substrate (26) by the sealant material which is impregnated (32) to provide a gas edge seal to the cathode substrate. Each fuel cell is completed during the formation of a fuel cell stack by compressing the fuel flow field plates and oxidant flow field plates to the unitized electrode assembly with gaskets. In a second embodiment, the oxidant flow field plate (27) is adhered to the cathode substrate by the sealant material which is impregnated into the cathode substrate to provide a gas edge seal, and the fuel flow field plate (18) is adhered to the oxidant flow field plate (27) by means of the sealant material (53). The entire fuel cell with gasket (9a) is formed in a single hot lamination step (45b).

7 Claims, 4 Drawing Sheets

FIG.1
Prior Art
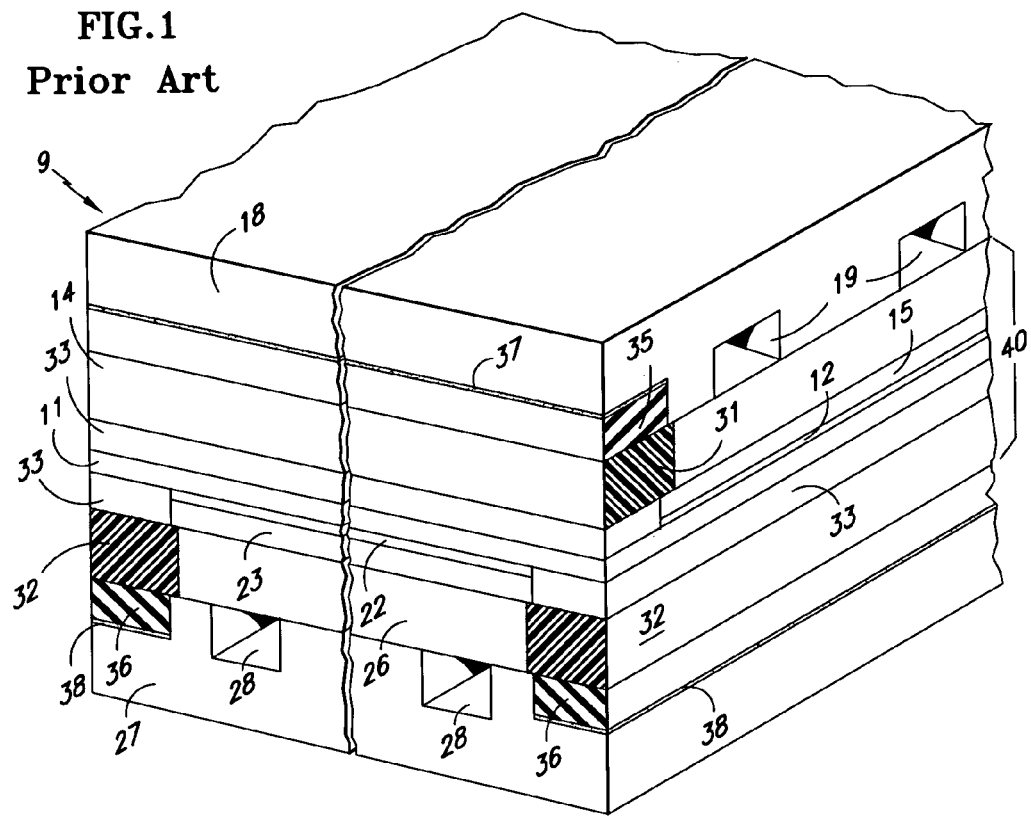
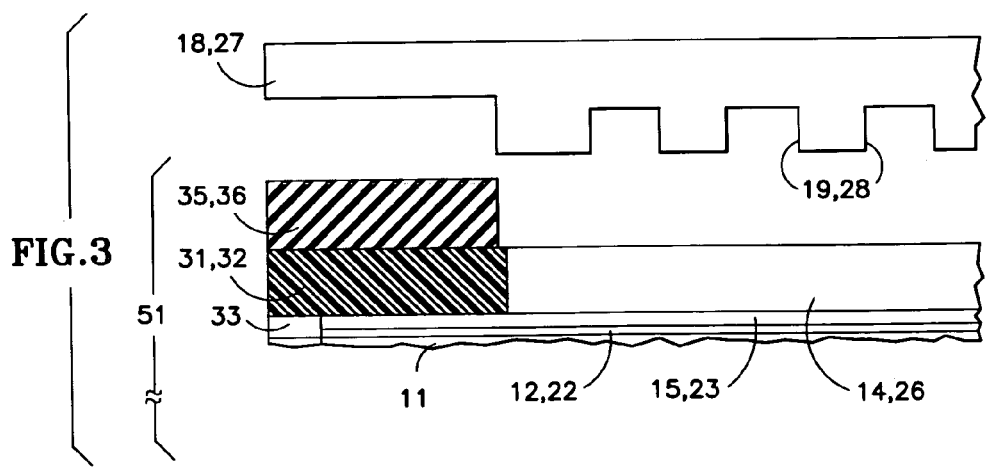
FIG.3

UNITIZED FUEL CELL ELECTRODE GASKET ASSEMBLY

CROSS REFERENCE TO RELATED APPLICATIONS

This application is a continuation of application Ser. No. 10/036,213, filed Dec. 28, 2001 now abandoned.

TECHNICAL FIELD

This invention relates to a proton exchange membrane (PEM) fuel cell in which the edge seals of the cathode and/or anode diffusion layers are joined to a gasket by means of the substrate-sealing thermoplastic film.

BACKGROUND ART

As is known, a PEM fuel cell has catalyst layers on the cathode and anode side of the membrane, possibly with optional diffusion layers formed as a coating on the cathode and anode substrates, respectively, which are on the non-membrane sides of the cathode and anode catalysts. The substrates, also known as carbon papers, are highly porous, which may, for instance, have on the order of 70% porosity with pores on the order of 30 microns in diameter. In order to prevent the oxidant reactant gas (such as air) and the fuel reactant gas (such as a hydrogen containing gas) from escaping through the side edges (those edges not in communication with respective external manifolds) it has been known to provide edge seals to the anode and cathode substrates.

In FIG. 1, an exemplary PEM fuel cell 9, of the general type known to the prior art, includes a proton exchange membrane 11, an anode catalyst 12 which may comprise a coating on the membrane of on the order of 10 micron thickness, an anode substrate 14, which may, optionally, have an anode diffusion layer comprising a coating 15 on the order of 25 microns on the surface of the substrate 14. The fuel flow field may typically comprise an anode flow field water transport plate 18 having fuel reactant gas flow channels 19 therein and a degree of porosity to permit water, typically from a coolant flow channel (not shown), to be absorbed in the fuel reactant gas so as to provide moisture through the anode layers to the membrane 11. Similarly, on the cathode side, there is a cathode catalyst 22, there may be an optional cathode diffusion layer 23, a cathode substrate 26, and an oxidant reactant gas flow field, typically comprised of a cathode flow field water transport plate 27 having oxidant reactant gas flow field channels 28 therein. In FIG. 1, external fuel reactant gas manifolds (not shown) will be in fluid communication with the fuel reactant gas flow field channels 19, and external oxidant reactant gas manifolds (not shown) will be in fluid communication with the oxidant reactant gas flow field channels 28.

To prevent gases from leaking from the substrate layers 14, 26, it is common to employ an edge seal 31, 32 which consists of a thermoplastic film such as polyvinylidene chloride (KYNAR®), or an elastomer, such as a silicone rubber, extruded into the substrate. Plastic films 33 may be provided as fillers at the edges of the anode and cathode catalysts and optional diffusion layers.

Interfacial seals between the anode water transport plate 18 and the anode substrate 14, as well as between the cathode water transport plate 27 and the cathode substrate 26 may typically comprise silicone rubber closed cell foam gaskets 35, 36, respectively, held in place, prior to compression in making the fuel cell stack, by pressure sensitive adhesive 37, 38. The pressure sensitive adhesive may be an acrylic adhesive or a silicone adhesive. It has been found that if an acrylic adhesive is used, the life of the fuel cell is limited to between 2,000 hours and 5,000 hours because of gas leakage due to the corrosion of the adhesive. A problem with either adhesive is the extra steps required to produce a unitized electrode assembly 40 (including the catalyst coated membrane and the substrates (with or without diffusion layers), and the extra steps required to produce the flow field seals assembly.

As illustrated in FIG. 2, the prior art process requires a hot lamination step 43 to provide the anode substrate 14 with the impregnated seal 31. A similar hot lamination step 44 is required to provide the cathode substrate 26 with the impregnated seal 32. Then, a third hot lamination step 45 is required to join the substrates 14, 26 with the catalyst coated membrane 11, 12, 22, in order to produce the unitized electrode assembly 40. The flow field plates 18, 27 have their respective silicone rubber gaskets 35, 36 adhered to them by pressure sensitive adhesive 37, 38 in compression steps 48, 47 to provide fuel and oxidant flow field plates with seals 48, 49. These are then brought together, along with other, similar fuel cell components to form a fuel cell stack assembly 50.

Fuel cells of the type described with respect to FIG. 1 are illustrated in U.S. Pat. Nos. 6,020,083, 6,159,628, and 6,187,466.

DISCLOSURE OF INVENTION

Objects of the invention include: an improved PEM fuel cell substrate gas edge seal; a PEM fuel cell substrate gas edge seal which can be provided on a high speed production basis; a low cost and effective PEM fuel cell substrate gas edge seal; reducing the number of processing steps required to produce a PEM fuel cell; and a PEM fuel cell that will operate in excess of 10,000 hours without gas leakage.

According to the present invention, the thermoplastic film impregnated into the anode substrate and the cathode substrate so as to form respective gas edge seals is utilized in providing a gas edge seal between at least one substrate and a corresponding reactant gas flow field plate, which may comprise a water transport plate in some embodiments. In a first embodiment of the invention, the edge seal impregnated thermoplastic is used as the bond between each substrate and a corresponding silicone rubber gasket, the gasket sealing the joint between the respective reactant gas flow field plate and corresponding substrate when the fuel cell parts are compressed together in the process of forming a fuel cell stack. According to another embodiment of the invention, at least one reactant gas flow field plate is bonded directly to a corresponding substrate by means of the impregnated edge seal thermoplastic of the corresponding substrate. The invention not only provides adhesion which will last well in excess of 10,000 hours of operation, but it also reduces the number of steps required to form a fuel cell, and to form a fuel cell stack.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 1 is a simplified, partial, sectioned perspective view of a prior art PEM fuel cell.

FIG. 3 is a side elevation view of a portion of a fuel cell in accordance with a first aspect of the invention.

MODE(S) FORE CARRYING OUT THE INVENTION

Figure 2:
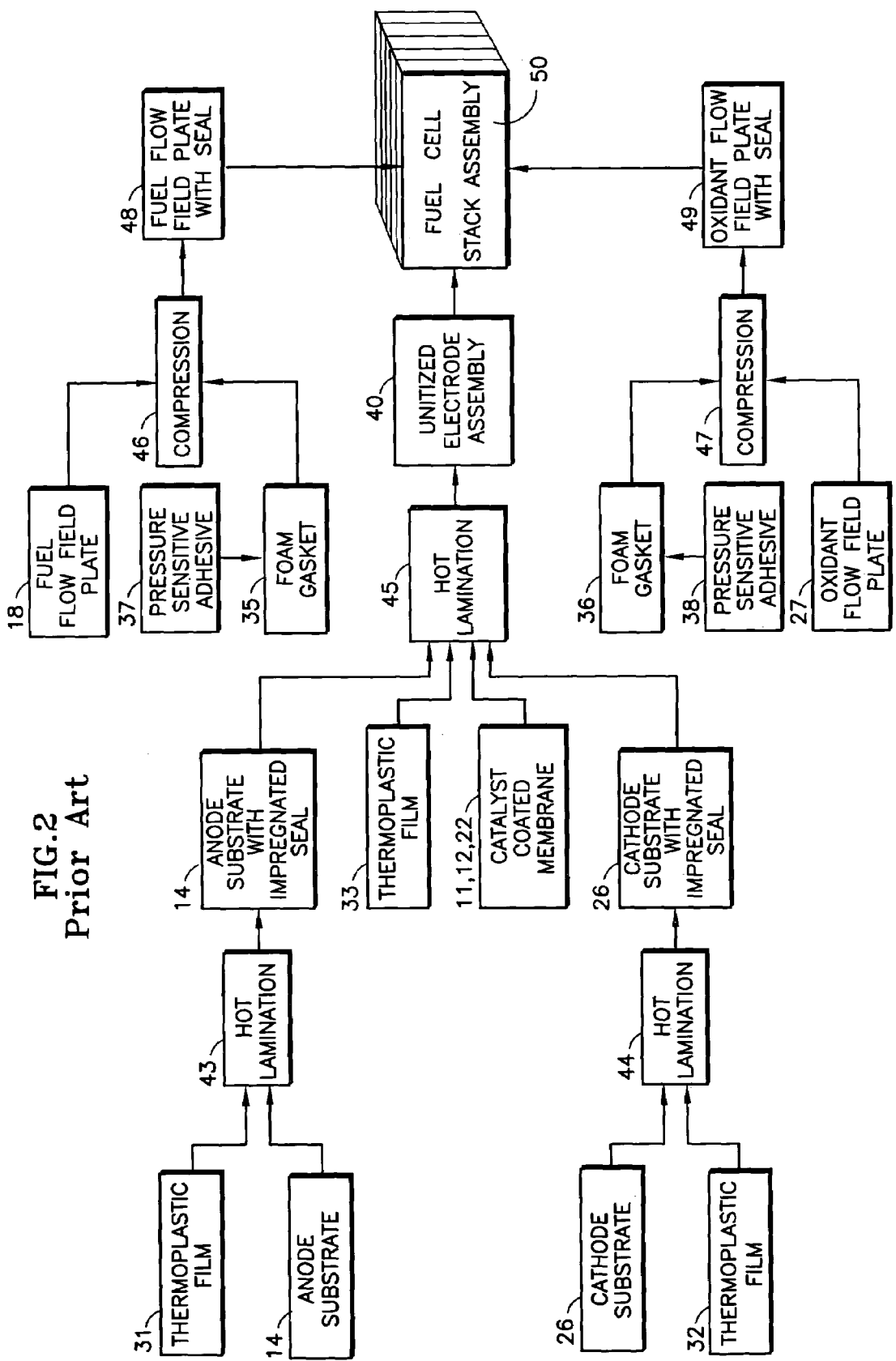
FIG. 2 is a simplified diagram illustrating the process of producing the fuel cell of FIG. 1.
Figure 4:
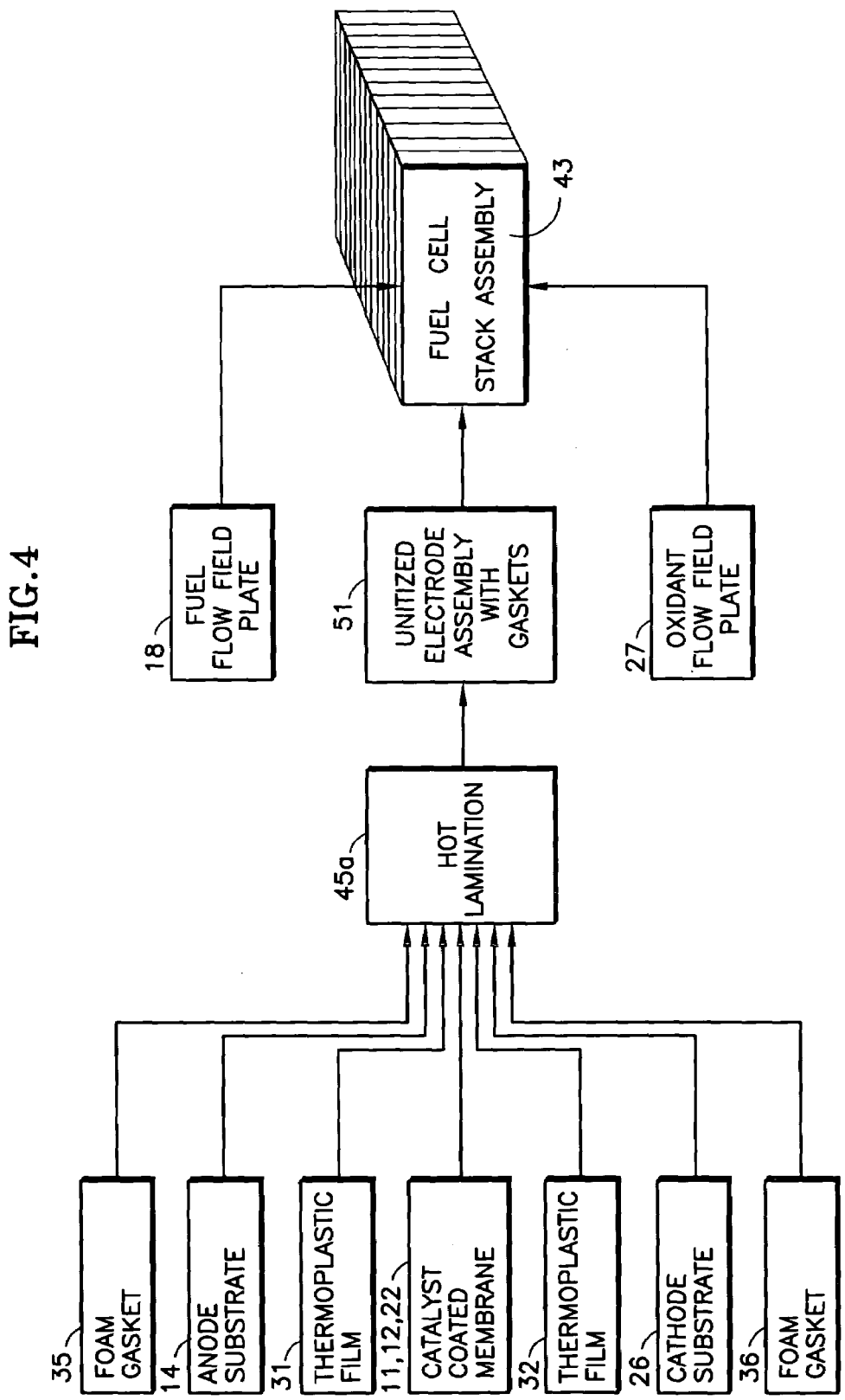
FIG. 4 is a chart illustrating the process of producing a fuel cell incorporating the invention illustrated in FIG. 3.

FIG. 3 illustrates one aspect of the present invention. Therein, the silicone rubber closed cell foam gasket 35 or 36 is adhered directly to a related one of the substrates 14 or 26, respectively, by the related sealant material 31 or 32 during the hot lamination which causes the substrate 14 or 26 to become impregnated with the plastic. The sealant material may be a thermoplastic polymer, a thermoset polymer, or an elastomeric polymer. The sealant material may be a film, a coating, an extrusion or any form that is conducive to high speed manufacturing. This process is illustrated in FIG. 4, in which a single hot lamination process 45a not only impregnates the anode substrate 14 and the cathode substrate 14, but it joins those substrates together with the gaskets 35 or 36 and the catalyst coated membrane 11, 12, 22. This forms a unitized electrode assembly with gaskets 51, which only need be combined with the fuel flow field plate 18 and the oxidant flow field plate 27 together with other similar fuel cell components to form the fuel cell stack assembly 43. Thus, instead of the three hot lamination steps 43, 44, 45 in the prior art process illustrated in FIG. 2, only one hot lamination step 45a is required in accordance with this aspect of the present invention.

Figure 5:
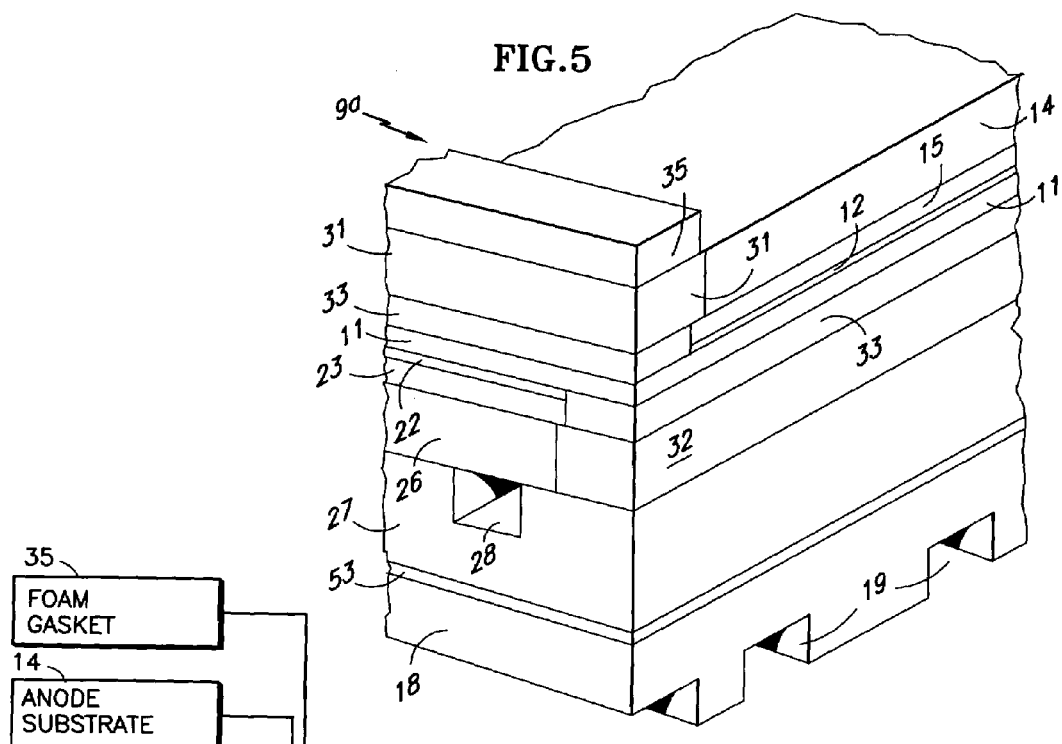
FIG. 5 is a fractional perspective view of a portion of a fuel cell illustrating a second aspect of the present invention.
Figure 6:
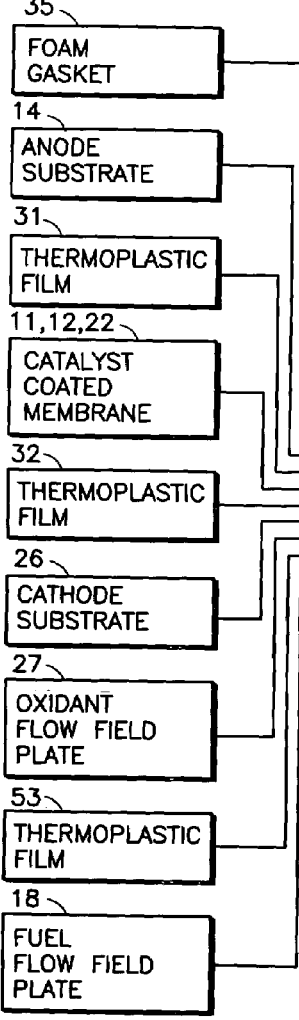
FIG. 6 is a chart illustrating the process of producing a fuel cell incorporating the invention of FIG. 5.
Figure 6:
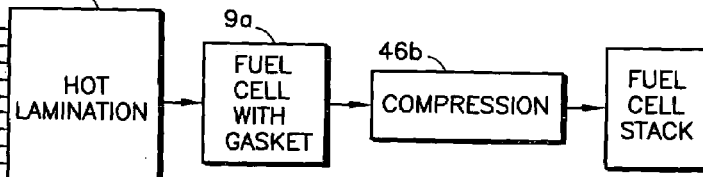

A further aspect of the invention is illustrated in FIG. 5. Therein, the gasket 35 is adhered by means of the thermoplastic 31 to the anode substrate 14, as described with respect to FIG. 3. But, the cathode substrate 26 is not provided with a gasket. Instead, the oxidant flow field plate 27 is adhered directly to the cathode substrate 26 by means of the thermoplastic material 32 at the time that the thermoplastic material 32 is impregnated into the cathode substrate 26. The fuel flow field plate 18 is joined by a thermoplastic material 53 to the oxidant flow field plate 27, thus eliminating one gasket and eliminating the need to shape the oxidant flow field plate with a notch to accommodate a gasket, as is illustrated in FIG. 3. Thus, an integral fuel cell is formed when this aspect of the invention is employed. The fuel call can be unitized with a single hot lamination process 45b, as illustrated in FIG. 6, which provides a fuel cell with gasket 9a. In such a case, only assembly is required to bring all of the fuel cells together in a fuel cell stack 43, in which the silicone rubber gasket 35 of one fuel cell will mate into the notch of a fuel flow field plate 18 of an adjacent fuel cell. The invention may, instead, adhere the fuel reactant flow field 18 to the anode substrate 14 and provide gaskets 36 on the cathode substrate 27. Of course, accommodations for the end cells will be made, which is well within the skill of the art in the light of the teachings herein.

Although the invention has been described relative to a fuel cell using external reactant manifolds (not shown), the invention may be applied to fuel cells containing internal reactant manifolds. The invention may be incorporated into fuel cells in which the flow fields may either be porous or solid flow fields known in the art.

The aforementioned patents are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A fuel cell comprising:
   a catalyst coated proton exchange membrane disposed between an anode substrate and a cathode substrate, each of said substrates being provided with an edge seal formed of a sealant material extruded into the substrate, only one of said substrates having a silicone rubber gasket adhered thereto only by said sealant material.

2. A fuel according to claim 1 wherein both of said substrates have a gasket adhered thereto by said sealant material.

3. A fuel cell according to claim 1 wherein:
   said sealant material comprises a thermoplastic polymer.

4. A fuel cell according to claim 1 wherein:
   said sealant material comprises a thermoset polymer.

5. A fuel cell according to claim 1 wherein:
   said sealant material comprises an elastomeric polymer.

6. A fuel cell according to claim 1 wherein:
   the other of said substrates has a reactant gas flow field plate adhered thereto by said sealant material which is extruded into said substrate, and a reactant gas flow field plate related to said one substrate is adhered to said first reactant gas flow field plate by said sealant material during said hot lamination process, to form an integral fuel cell with a gasket.

7. A fuel cell stack comprising a plurality of fuel cells according to claim 6 compressed together, whereby the gasket of one fuel cell provides a gas seal with the second reactant flow field plate of a fuel cell adjacent thereto in said stack.

* * * * *